May 23, 1967

W. F. STAHL 3,320,729

APPARATUS FOR REMOVING LIQUID FROM A LIQUID LADEN GAS STREAM

Filed May 17, 1963

WITNESSES
Theodore F. Wrobel
James F. Young

INVENTOR
William F. Stahl
BY
Frank Cristiano Jr.

United States Patent Office 3,320,729
Patented May 23, 1967

3,320,729
APPARATUS FOR REMOVING LIQUID FROM A LIQUID LADEN GAS STREAM
William F. Stahl, Middletown Township, Delaware County, Pa., assignor to Westinghouse Electric Corporation, Pittsburgh, Pa., a corporation of Pennsylvania
Filed May 17, 1963, Ser. No. 281,266
5 Claims. (Cl. 55—461)

This invention relates to apparatus for removing liquid from a liquid laden gas stream and has for an object to provide improved apparatus of this type.

Another object is to provide apparatus of the above type that employs fluid flow phenomena in a highly unusual manner to remove the liquid from the liquid laden gas stream with removal of less gas from the apparatus than heretofore required, thereby increasing the efficiency of the apparatus.

A further object is to provide a liquid-gas separator of the above type that is compact, simple in structure, yet highly effective to remove liquid from a moving gas stream even at relatively high velocities.

In accordance with the invention, there is provided a tubular duct structure defining a passage having a curvilinear central axis for guiding a pressurized fluid stream in a curved path. The passage is divided into a primary and a secondary passageway by axially extending internal wall structure such as a partition, and the partition is provided with a plurality of apertures providing a fluid flow communication between the two passageways. The scondary passageway is disposed radially inwardly of the primary passageway and means is provided to connect the secondary passageway to a region of lower pressure than the pressure of the gas stream.

In operation, as liquid laden gas flows through the primary passageway in a curved path, the liquid being heavier than the gas is thrown radially outwardly. However, secondary flow paths of spiral or helical nature are established and the thus centrifugally separated liquid is carried by the secondary flow to the inner portion of the primary passageway and collected on the partition. As the liquid is thus collected, it is drawn through the apertures into the secondary passageway for removal from the apparatus. Since the separated liquid collects on the partition considerably less gas than heretofore required need be removed from the apparatus during removal of the liquid.

The above and the other objects are effected by the invention as will be apparent from the following description and claims taken in connection with the accompanying drawing, forming a part of this application, in which:

Figure 1:
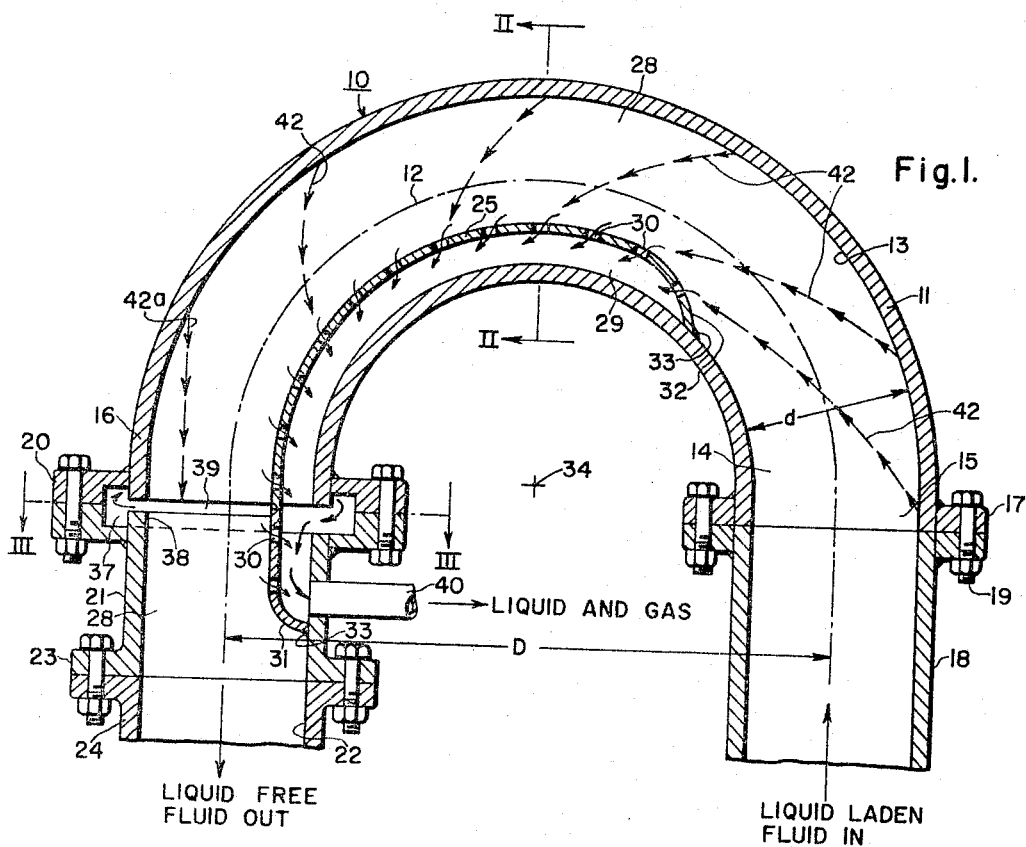
FIG. 1 is an axial sectional view of a structure for removing liquid from a liquid laden gas stream in accordance with the invention.

Referring to the drawing in detail, there is shown a structure 10 formed in accordance with the invention, for removing liquid from a moving liquid laden gas stream, comprising an open-ended hemi-toroidal tubular duct member 11 having a curvilinear central axis 12, and an internal wall 13 of curved shape, such as circular, defining a fluid flow passage 14 extending axially from one end 15 of the duct member to the other end 16. The end 15 may be provided with a suitable flange structure 17 for connection to a flanged supply conduit 18 for delivering the liquid laden gas stream to the structure 11 and may be connected thereto by any suitable fastening means such as an annular array of bolts 19. The end 16 is also provided with flange structure 20 for connecting the tubular member 11 to a tubular transition duct structure 21 of substantially straight form having an internal wall 22 of the same cross-sectional shape and size as the duct member 11, and this structure 21 may be provided with suitable flanges 23 for connection to a suitable conduit 24 for delivering the gas stream from the apparatus after removal of the liquid therefrom.

Figure 3:
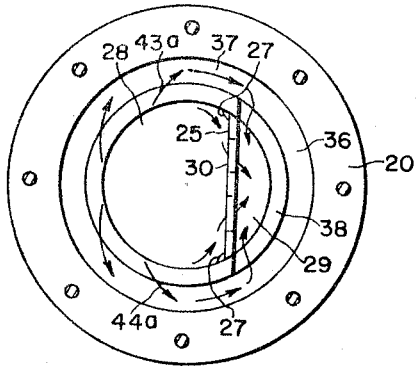
FIG. 3 is a cross-sectional view taken on line III—III of FIG. 1.
Figure 2:
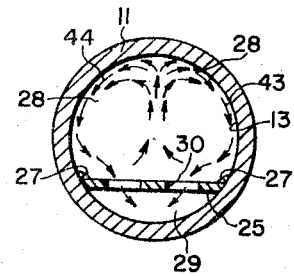
FIG. 2 is a cross-sectional view taken on line II—II of FIG. 1.

Within the tubular structure 11 there is provided a partition structure 25 extending substantially in the same direction as the central curvilinear axis 12 of the structure 11, but radially inwardly thereof. The partition structure 25 as illustrated in FIGS. 2 and 3 may be of substantially straight cross-sectional form and connected to the internal walls 13 and 22 by welding as indicated at 27 in FIGS. 2 and 3, in a substantially chordal manner. The partition structure 25 divides the flow passage 14 into a primary passageway 28 of relatively large cross-sectional area and a secondary passageway 29 of relatively small cross-sectional area and is provided with a plurality of apertures 30 distributed along its length to provide a restricted communication between the primary passageway 28 and the secondary passageway 29.

The partition structure 25 may, if desired, extend beyond the outlet end 16 of the hemi-toroidal member 11 into the transition duct member 21 and is provided with curved downstream and upstream end portions 31 and 32, respectively. The downstream and upstream end portions 31 and 32, are welded to the internal walls 22 and 13, respectively, as indicated at 33 in FIG. 1. Accordingly, the apertures 30 in the partition provide communication between the primary passageway 28 and the secondary passageway 29.

For simplicity of explanation and comprehension, the center 34 of the hemi-toroidal member 11 has been indicated and with reference thereto, it will be noted that the partition is disposed normal to a line radiating from the center 34 and the secondary passageway 29 is disposed radially inwardly of the primary passageway 28.

Although any suitable flange structure 20 may be employed to connect the hemi-toroidal member to the cylindrical member 21, as illustrated in FIG. 1 it is desirable to form the flange structure 20 with an annular recess 36 encompassing the outlet end 16 of the hemi-toroidal member and an annular recess 37 encompassing the inlet end 38 of the transition member 21 and in open communication with the recess 36. The inlet and outlet ends 38 and 16, respectively, are disposed in spaced relation with each other to provide an annular opening 39. Accordingly, the primary passageway 28 and the secondary passageway 29 also communicate with each other by way of the recesses 37 and 36, as shown in FIGS. 1 and 3.

The secondary passageway 29 is connected to a region (not shown) of lower pressure than the pressure of the fluid flowing through the primary passageway 28 by a suitable drain conduit 40 extending through the radially innermost portion of the transition structure 21 and communicating with the secondary passageway 29.

In operation, a liquid laden gas stream from a suitable supply (not shown) is directed into the apparatus by the conduit 18. During flow of the liquid laden gas stream through the hemi-toroidal member 11, the liquid particles being heavier than the gas are thrown radially outwardly by centrifugal force. As the liquid particles are thrown radially outwardly by the centrifugal force, they impinge upon the wall surface 13 of the duct member 11, and form a relatively thin film of liquid thereon. Although gas is lighter than the liquid, it does not substantially follow the curvilinear axis of the duct member 11. Instead, during its flow therethrough, the gas forms a secondary flow pattern indicated by the arrows 42 in FIG. 1. This secondary flow phenomenon causes the gas to flow in substantially helical or spiral paths, as best indicated by the arrows 43 and 44 in FIG. 2, with respect to the curvilinear axis of the duct member 11 and these helical paths are in opposite directions. For example, the helical paths indicated by the arrows 43 are in clockwise direction about the right half of the passageway 28 while the other helical paths indicated by the arrows 44 are established about the left half of the passageway 28 in the opposite or counterclockwise direction. These secondary flow paths continuously sweep the inner wall 13 as they proceed throughout the internal length of the duct structure 11 and during such flow they drive the liquid film that has collected along the wall 13 by centrifugal effect, in radially inwardly directions with respect to the center of curvature 34 of the duct member 11 towards the partition 25. Accordingly, although the liquid forms in thin films along the internal wall 13, as it is converged toward the partition the film thickness increases and the liquid accumulates on the partition. Since the secondary passageway 29 is maintained at a lower pressure than the fluid in the passageway 28, the liquid, as it collects on the partition, is drawn through the apertures 30 into the secondary passageway 29 with concomitant removal of a relatively small amount of gas as the moving vehicle and is then directed through the drain conduit 40 for elimination from the system.

As the gas stream proceeds to flow through the duct member 11, it is liberated of its liquid progressively by the above phenomenon until by the time it arrives at the transition member 22 it is substantially in a dry or liquid free condition and is directed through the conduit 24, for use as desired, to subsequent apparatus (not shown).

Referring again to FIG. 1, it will be noted that as the fluid proceeds toward the outlet end 16, there may be some secondary flow paths 42a that are not completed, so that some of the liquid entrained in the secondary flow is not directed to the partition 25 and might otherwise be directed with the gas flow through the conduit 24. Such minor flow of liquid is prevented from becoming re-entrained in the substantially dry gas stream, by the annular opening 39 at the outlet end 16 of the duct member 11 and the inlet end 38 of the transition number 22. Since the recesses 36 and 37 are in communication with the secondary passageway 29, such liquid flowing along the secondary flow path 42a is delivered to the secondary passageway 29 through the annular opening 39 and recesses 36 and 37, as well as through the apertures 30, as indicated by the arrows 43a and 44a.

Although for simplicity the duct member 11 has been illustrated as substantially of hemi-toroidal form, i.e. half of a torus, it may be semi-toroidal, i.e. any portion of a torus, and it may be of any suitable shape for example elliptical. That is, although it has been shown as curving through an angle of substantially 180°, it may be extended through a larger angle for more complete separation of the liquid from the gas stream or, if desired, it may extend through a smaller angle. Also, although the mean diameter D of the structure may be in the ratio of about 4½ to 1 with respect to the diameter $d$ of the passage 14 in the hemi-toroidal member 11, this ratio may be larger or less than that shown with highly satisfactory results.

In the illustration, when the curved portion of the structure is substantially of 180° extent, connection thereof to the inlet conduit 18 and the outlet conduit 24 is facilitated since the liquid separating structure may act as an interconnector between these two conduits that employs little additional space and lends itself to compactness of physical configuration.

With the above arrangement, the velocity of the gas stream that may be accommodated may vary throughout a considerable extent and it has been found that the liquid separation is effective even with high velocities on the order of about 500 feet per second.

Although for simplicity the partition structure 25 has been described as simple partition connected to the apparatus, it may be formed integrally therewith if so desired, and may be divided adjacent the downstream end 16 for facility of manufacture.

Also, since as the gas stream flows through the hemi-toroidal member 11 it is progressively relieved of its liquid, the apertures 30 in the partition structure 25 may be graduated in size in down stream direction with the larger apertures at the up stream end of the partition and the smaller apertures at the down stream end of the partition and of sufficient area to accommodate the flow of the liquid therethrough with a minimum of attendant gas flow, thereby to enhance the efficiency of separation with a minimization of removal of the gas from the system as the vehicle for the liquid being removed.

It will now be seen that the invention provides a liquid-gas separator structure of highly unusual form operable in a highly unusual manner to permit separation of liquid from a liquid laden gas stream with high efficiency.

It will further be seen that the invention provides a liquid-gas separator device that employs the secondary internal flow phenomenon to carry the liquid separated from the gas by centrifugal effect to the innermost portions of the separator for collection before removal from the structure.

Although the apparatus described above has been described in connection with a liquid laden gas stream, it will be understood that the invention is highly desirable for use in separating condensate from a wet steam supply, thereby permitting the removal of the condensate from the stream before delivery of the steam to steam utilizing apparatus. As well known in the art, the formation of condensate in a steam supply is harmful to steam utilizing apparatus because of the erosion of metal parts by the impingement of the moisture particles at the high velocities obtained by such steam flows.

Although only one embodiment has been shown, it will be obvious to those skilled in the art that it is not so limited, but is susceptible of various other changes and modifications without departing from the spirit thereof.

I claim as my invention:

1. Apparatus for removing liquid from a liquid laden pressurized gas stream comprising
   a substantially imperforate tubular duct structure defining a liquid flow passage having a curvilinear central axis,
   a partition disposed in said duct structure and dividing at least a portion of said passage into axially elongated primary and secondary passageways,
   said secondary passageway being disposed radially inwardly of said primary passageway,
   said duct having an inlet portion for admitting a liquid laden gas stream into said passage,
   said partition having opposed end portions in abutment with said duct structure and having a plurality of apertures providing restricted fluid flow communication between said first and second passageways,
   said primary passageway having the characteristics of inducing a spiral secondary flow pattern in said gas stream,
   whereby liquid separated from the gas stream in said primary passageway by centrifugal force is directed through said apertures into said secondary passageway by said secondary flow effects,
   means communicating with said secondary passageway for removing the liquid from said secondary passageway, and
   said duct having an outlet for discharging the substantially liquid-free gas stream from said primary passageway.

2. The structure recited in claim 1 wherein
   the inlet is disposed adjacent one end of the partition and the outlet is disposed adjacent the opposite end of the partition.

3. The structure recited in claim 2 wherein
the duct structure has an internal surface of curved cross-sectional shape, and
the primary passageway is of larger cross-sectional area than the secondary passageway.

4. The structure recited in claim 2, wherein
the duct structure has an internal surface of circular cross-sectional shape,
the partition has a portion of planar cross-section chordally disposed in the duct structure and dividing the duct into the primary and secondary passageways, the primary passageway being of larger cross-sectional area than the secondary passageway.

5. The structure recited in claim 1, wherein
the opposed end portions of the partition are curved in radially inward direction into abutment with the duct structure, and further including
means defining an annular internal recess encompassing the outlet of said duct structure, and
means providing a fluid flow communication between the primary passageway, the secondary passageway and said recess,
whereby liquid entrained by uncompleted portions of the secondary flow effects in the primary flow passage is intercepted by said recess and directed to the secondary passageway for removal.

References Cited by the Examiner
UNITED STATES PATENTS

| | | | |
|---|---|---|---|
| 297,436 | 4/1884 | Ortman et al. | 55—461 |
| 1,885,645 | 11/1932 | Vawter | 55—461 |
| 2,186,344 | 1/1940 | Price | 55—396 |
| 2,659,450 | 11/1953 | Baird | 55—396 |
| 3,102,800 | 9/1963 | Bora | 55—461 |

FOREIGN PATENTS

| | | |
|---|---|---|
| 1,287,552 | 2/1962 | France. |
| 5,175 | 9/1920 | Netherlands. |
| 41,795 | 10/1937 | Netherlands. |
| 41,864 | 10/1937 | Netherlands. |

OTHER REFERENCES

Vennard, J. K.: Elementary Fluid Mechanics (second edition), John Wiley & Sons, New York, 1947, see page 139.

HARRY B. THORNTON, *Primary Examiner.*